(12) United States Patent
Chen et al.

(10) Patent No.: US 12,026,712 B2
(45) Date of Patent: *Jul. 2, 2024

(54) DYNAMIC APPLICATION SELECTION BASED ON CONTEXTUAL DATA

(71) Applicant: Visa International Service Association, San Francisco, CA (US)

(72) Inventors: Yuexi Chen, Foster City, CA (US); Simon Hurry, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,329

(22) Filed: Sep. 28, 2022

(65) Prior Publication Data

US 2023/0017281 A1 Jan. 19, 2023

Related U.S. Application Data

(63) Continuation of application No. 17/625,716, filed as application No. PCT/US2020/042292 on Jul. 16, 2020, now Pat. No. 11,488,163.

(60) Provisional application No. 62/875,427, filed on Jul. 17, 2019.

(51) Int. Cl.
| | | |
|---|---|---|
| G06Q 20/40 | (2012.01) | |
| G06Q 20/20 | (2012.01) | |
| G06Q 20/30 | (2012.01) | |
| G06Q 20/32 | (2012.01) | |
| G06Q 20/34 | (2012.01) | |

(52) U.S. Cl.
CPC ......... *G06Q 20/401* (2013.01); *G06Q 20/206* (2013.01); *G06Q 20/30* (2013.01); *G06Q 20/3278* (2013.01); *G06Q 20/341* (2013.01); *G06Q 20/407* (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 8,196,131 B1 * | 6/2012 | von Behren | G06Q 20/382 705/64 |
| 8,799,087 B2 | 8/2014 | Martin et al. | |
| 9,705,886 B2 * | 7/2017 | Sharma | G06Q 20/3263 |
| 9,965,762 B2 | 5/2018 | Mestre | |
| 10,445,718 B2 | 10/2019 | Jones et al. | |
| 10,496,385 B2 | 12/2019 | Evans | |

(Continued)

FOREIGN PATENT DOCUMENTS

| | | |
|---|---|---|
| EP | 3467743 A1 | 4/2019 |
| JP | 2018509699 A | 4/2018 |

OTHER PUBLICATIONS

Application No. PCT/US2020/042292, International Search Report and Written Opinion, dated Oct. 21, 2020, 9 pages.

*Primary Examiner* — Chenyuh Kuo
(74) *Attorney, Agent, or Firm* — Kilpatrick Townsend & Stockton LLP

(57) ABSTRACT

Systems and methods provide dynamic application selection based on contextual data of a transaction. A portable device may include multiple applications with which a transaction may be processed. These applications may be associated with a variety of priorities. The portable device may provide a list of these applications to an access device from which one application may be selected.

20 Claims, 6 Drawing Sheets

(56) References Cited

U.S. PATENT DOCUMENTS

| | | |
|---|---|---|
| 11,488,163 B2 * | 11/2022 | Chen .................... G06Q 20/341 |
| 2014/0143149 A1 | 5/2014 | Aissi |
| 2015/0221043 A1 | 8/2015 | Chithambaram et al. |
| 2016/0140535 A1 | 5/2016 | Noe et al. |
| 2018/0213377 A1 | 7/2018 | Lau et al. |
| 2018/0373572 A1 | 12/2018 | Deivanayagam et al. |
| 2020/0134587 A1 | 4/2020 | Rice et al. |

* cited by examiner

DYNAMIC APPLICATION SELECTION BASED ON CONTEXTUAL DATA

CROSS-REFERENCE TO RELATED APPLICATIONS

This application is a continuation of U.S. patent application Ser. No. 17/625,716, filed Jan. 7, 2022, which is a 371 National Stage of International Application No. PCT/US2020/042292, filed Jul. 16, 2020, which claims the benefit of the filing date of U.S. Provisional Application No. 62/875,427, filed Jul. 17, 2019, the disclosures of which are incorporated by reference herein in their entireties.

BACKGROUND

Systems and methods for processing transactions between user devices and access devices are known. In these examples, data is communicated or exchanged between the user device and the access device. For example, a user may use a user device to execute data exchange with an access device (e.g., a smartcard reader) to allow a user to access a building and/or event. In another example, in the case of a payment transaction, a user may use a user device (e.g., payment card or digital wallet application on a smartphone device) to execute a contactless (or contact) data exchange with an access device (e.g., a Point-of-Sale (POS) terminal).

However, a number of problems exist with existing systems and methods for processing transactions. For example, the user device may be configured with a number of data fields that indicate a number of access applications usable by the user device and corresponding priorities (e.g., a high priority, a low priority, etc.) for each access application. However, conventional terminals may fail to enforce these defined priorities when the user device is used in different regions or circumstances. Accordingly, a solution is needed to enable the priority of access applications to be enforced, preferably without changing the existing functionality of conventional access devices.

Illustratively, when a user may wish to use a user device (e.g., an access badge) to access different company facilities in different geographic areas (e.g., in the U.S. and in Canada). Each location at each different geographic area may have a different security protocol associated with it, and each user device may have multiple applications with different security protocols, respectively. The user may have a home location such as the United States. A first application on the user device would be the priority application chosen by any access device (e.g., a badge reader) in that home location. When the user visits a different location (e.g., Canada), the access device at the visited location may be most compatible with a second application on the user device. The access device in the visited location would need to choose the second application on the user device in order for it to work properly with the user device. This can be problematic, since the different access devices at the different locations need to be specially programmed to allow access to the user using the same user device.

Embodiments of the disclosure address these and other problems, individually and collectively.

SUMMARY

Systems and methods for improving communications between user devices and access devices are disclosed.

One embodiment of the invention includes a method including: receiving, by a user device from an access device, an available applications request message in an interaction; identifying, from memory of the user device, at least a first application and a second application; transmitting, by the user device to the access device, an available applications response message including an application list including the first application and the second application, the application list being ordered according to a first priority and a second priority to indicate a preference for the access device to use the first application over the second application to process the interaction; receiving, by the user device from the access device, a selection of the first application; receiving, at the first application of the user device, contextual data associated with a transaction; determining that the contextual data is consistent or not consistent with user device data stored in memory of the user device; and processing the transaction using the second application.

Another embodiment of the invention includes a user device including: a processor; and a non-transitory computer readable medium including instructions that cause the processor to perform the steps of: receiving, by a user device from an access device, an available applications request message in an interaction; identifying, from memory of the user device, at least a first application and a second application; transmitting, by the user device to the access device, an available applications response message including an application list including the first application and the second application, the application list being ordered according to a first priority and a second priority to indicate a preference for the access device to use the first application over the second application to process the interaction; receiving, by the user device from the access device, a selection of the first application; receiving, at the first application of the user device, contextual data associated with a transaction; determining that the contextual data is consistent or not consistent with user device data stored in memory of the user device; and processing the transaction using the second application.

Another embodiment of the invention includes a system including: a user device including a processor and a non-transitory computer readable medium including instructions that cause the processor to perform the steps of: receiving, by a user device from an access device, an available applications request message in an interaction, identifying, from memory of the user device, at least a first application and a second application, transmitting, by the user device to the access device, an available applications response message including an application list including the first application and the second application, the application list being ordered according to a first priority and a second priority to indicate a preference for the access device to use the first application over the second application to process the interaction, receiving, by the user device from the access device, a selection of the first application, receiving, at the first application of the user device, contextual data associated with a transaction, determining that the contextual data is consistent or not consistent with user device data stored in memory of the user device, and processing the transaction using the second application; and the access device These and other embodiments of the invention are described in further detail below, with reference to the Figures and the Detailed Description.

DETAILED DESCRIPTION

Figure 1:
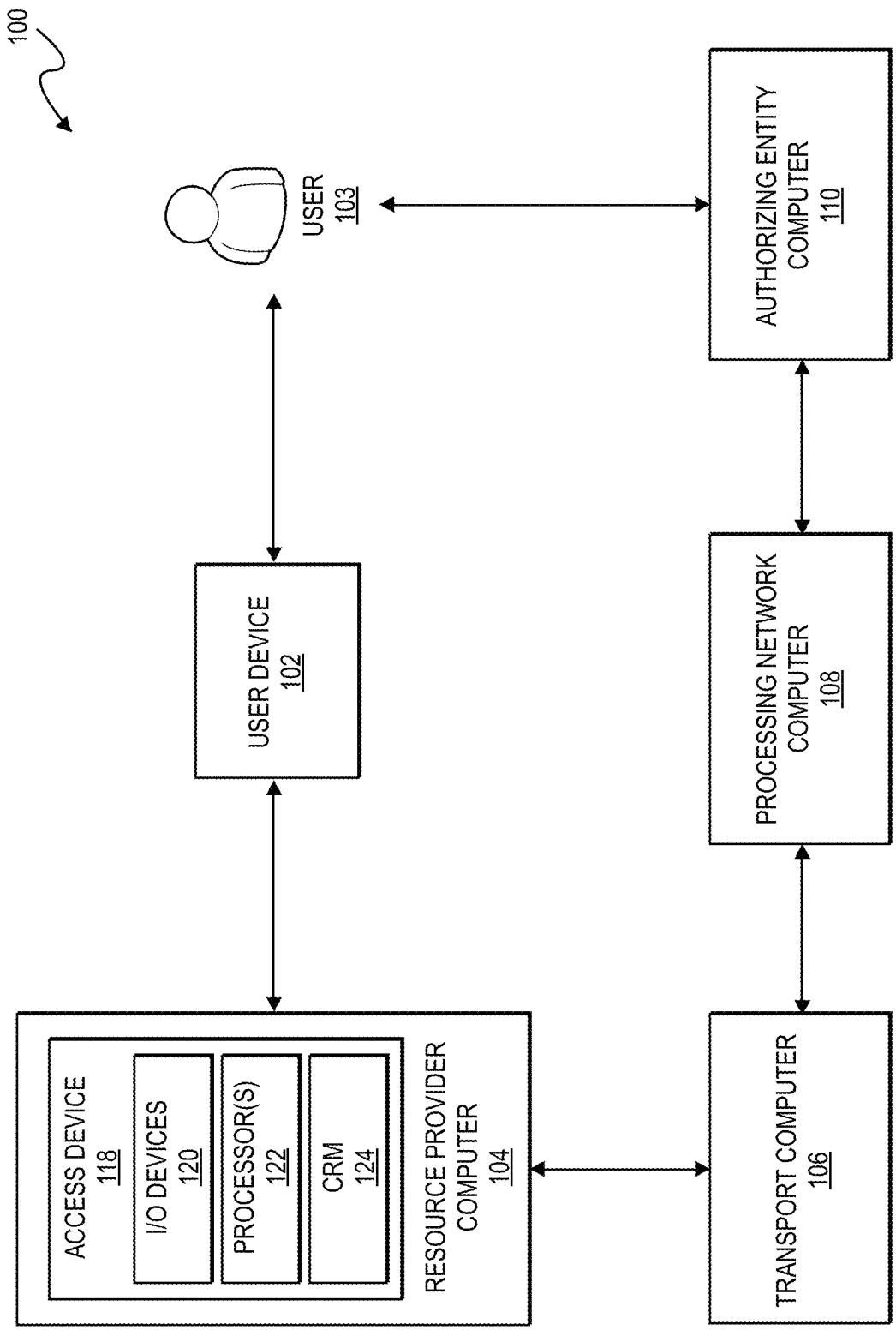
FIG. 1 shows a block diagram of a system according to an embodiment.

Embodiments can include methods and systems that can facilitate processing transactions between a user device (e.g., a mobile phone, contact/contactless card, etc.) and an access device (e.g., a POS terminal, a smartcard reader, etc.). The applications used to exchange messages between a user device and an access device can be dependent on contextual data related to the interaction (e.g., transaction).

Prior to discussing the details of some embodiments of the present disclosure, description of some terms may be helpful in understanding the various embodiments.

A "user device" may be any suitable device that can be used by a user (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "portable device" may be any suitable user device that may be transported by a user. Portable devices may include mobile phones, smartphones, payment cards, and the like.

A "mobile device" (sometimes referred to as a mobile communication device) may include any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc.

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

An "access device" may be any suitable device for providing access to something. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from a user device. In some embodiments, where an access device is a POS terminal, the POS terminal may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

A "resource provider" can be an entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services. A resource provider computer may be operated by or on behalf of a resource provider.

"Authentication data" may include any data suitable for authenticating an entity. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically, a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processing server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived.

An "authorization request message" may be an electronic message that requests authorization for an interaction. In some embodiments, it is sent to a processing network computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also include additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also include "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction. An "authorization request message" may also be used to request authorization to access a location, access secure data, etc.

An "authorization response message" may be a message that responds to an authorization request. In some cases, it may be an electronic message reply to an authorization request message generated by an issuing financial institution or a processing network computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network computer) to the merchant's access device (e.g., POS equipment) that indicates approval of the transaction. The code may serve as proof of authorization.

An "authorizing entity" may be an entity that authorizes a request. Examples of an authorizing entity may be an issuer, a transit agency, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device such as a debit card or credit card.

An "transaction processing protocol" may include a protocol for processing a transaction. A transaction processing protocol may be associated with processing data associated with a transaction. The protocol may further define a set of messages, data fields for those messages, interfaces, functions calls, message flows, or the like for communicating data between devices.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may include one or more microprocessors working together to accomplish a desired function. The processor may include CPU includes at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s)

A "memory" may be any suitable device or devices that can store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

An "application" may be a computer program that is used for a specific purpose. Examples of applications may include transit applications, secure data access applications, banking applications, digital wallet applications, event ticketing applications, loyalty rewards applications, etc. In some embodiments, an application may be associated with an account of the user maintained by a resource or service provider (e.g., a bank account, a mass transit prepaid account, a building access account, etc.). The applications in embodiments can be delineated by labels such as "first," "second," "third," etc. These labels may not imply a particular priority or relative characteristic. For example, a "second application" have a higher priority than a "first application," and vice-versa.

An "applications list" may include a list of applications. Applications in an applications list include applications data that allow a user of the user device to access different locations via different access device. Applications in an applications list may include applications that allow payment transactions to be conducted in different geographic regions.

An "Application Identifier" (AID) can be a value that is used to uniquely identify each application that an access device supports. Both user devices and access devices may support multiple AIDs. An AID may also be used to identify the system environment supported by an access device (e.g., PSE, PPSE). A user device may store a list of applications identifiers, where each application identifier corresponds to a different application on the user device. The AIDs of one or more applications on the list may be transmitted to the access device during the transaction initialization process, to be used by the access device in determining which applications are mutually supported by both the access device and the user device, and ultimately which application should be selected by the access device from a candidate list to initiate a transaction. An AID can be formed by the concatenation of a Registered Application Provider Identifier (RID), which may be an alphanumeric value, and an optional Proprietary Application Identifier Extension (PIX), which is typically a numeric value. For example, the AID for an access device supporting PPSE may be '2PAY.SYS.DDF01' (i.e. RID, with no PIX extension), represented in hexadecimal as '325041592E5359532E4444463031.' Also, the AID for a credit card application may, for example, have a RID value of 'A000000003' and a PIX value of '1010.' Thus, concatenated, the AID may be 'A0000000031010.'

A "Payment System Environment" (PSE) can be a mechanism for a user device to store a directory structure that holds records containing a number of applications that are available on the user device to be used to execute transactions. The "Proximity Payment System Environment" (PPSE) is applicable only for contactless communication between a user device and an access device. The PPSE on a user device contains a list of all applications supported by the contactless interface, and is returned from the user device to an access device that issued a SELECT command for the PPSE. Both the PSE and PPSE mechanisms may be used to facilitate a message exchange protocol whereby an access device may select an application (e.g., from a list of applications) on a user device to proceed with a transaction. The messages exchanged under both the PSE and PPSE mechanisms may utilize an "Application Protocol Data Unit" (APDU) format. The APDU is a data unit transferred between an access device and a user device. A transaction may include multiple APDU exchanges to read data from a user device and perform the necessary processing steps.

"Contextual data" may include any suitable data from which a context of a transaction may be determined. For example, contextual data may include any suitable combination of 1) a recorded log of previous transactions, 2) an indication of a particular application selected for a previous transaction, 3) a currency code of a previous transaction, 4) a terminal country code of a previous transaction, 5) a transaction type of a previous transaction, 6) a current transaction application selection, 7) a currency code associated with the current transaction/current access device, 8) a terminal country code associated with the current transaction/current access device, 9) a transaction type of current transactions, and/or 10) any suitable data associated with past transactions and or the current transaction.

"User device data" may be data that is stored on a user device. In some embodiments, user device data may be data that is loaded and stored in a memory on the user device at the time that the user device is issued. For example, user device data can include a country code, currency code, an issuer identifier (e.g., a BIN or bank identification number), a primary account number (PAN), etc.

Details of some embodiments of the present disclosure will now be described in greater detail.

FIG. 1 shows a block diagram of a system 100 according to an embodiment. The system 100 may be used to facilitate data communications utilizing the various computers depicted in FIG. 1 for authentication, access control, and/or authorizing financial and/or non-financial transactions. The system 100 includes a user device 102, a resource provider computer 104, a transport computer 106, a processing network computer 108, and an authorizing entity computer 110. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The user device 102 may be in any suitable form. For example, the user device 102 may include cellular phones, personal digital assistants (PDAs), a net book, a smart watch, a laptop computer, pagers, smart media, and the like. In some embodiments, the user device 102 is in the form of a card such as a payment card or an access badge.

In some embodiments, user device 102 may include circuitry that is used to enable certain device functions, such as telephony. The functional elements responsible for enabling those functions may include one or more processors that can execute instructions that implement the functions and operations of the user device 102. The processor(s) may access memory of the user device 102 to retrieve instructions or data used in executing the instructions, such as provisioning scripts and mobile applications. The user device 102 may include input/output elements, such as a keyboard, a display, a speaker, a microphone, and/or a touchscreen. These I/O elements may be used to enable a user 103 to operate the user device 102 and input data. These input/output elements may also be configured to output data, via a speaker of the device, for example. The user device 102 may also use a display to output data.

The user device 102 may include memory that may include an application and/or any other suitable module or data. The user device 102 may have any number of applications installed or stored on the memory. The memory of user device 102 may also include code, executable by one or more processors for implementing the methods discussed herein. In some embodiments, the memory may be configured to store sensitive data (e.g., payment data such as track 2 data).

In some embodiments, the user device 102 may be a portable device such as a payment card or an access badge. The user device 102 may include a contactless element for interfacing with an access device (e.g., the access device 118). The contactless element may include a chip, and may include the capability to communicate and transfer data using near field communications (NFC) technology or other short range communications technology. The user device 102 may also include a memory, which may store user information such as an account number, expiration date, and a username. Such information may also be printed or embossed on the substrate. The substrate may also have a magnetic stripe on it.

The resource provider computer 104 may be operated by or on behalf of a resource provider (e.g., a merchant) and the transport computer 106 may be associated with the resource provider. For example, the transport computer 106 may be operated by an acquirer (e.g., a financial institution) responsible for managing an account associated with the resource provider. The authorizing entity computer 110 may be operated by an issuer (e.g., another financial institution). In some embodiments, entities are both acquirers and issuers, and embodiments of the invention include such entities.

The processing network computer 108 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base 11 system which performs clearing and settlement services.

The processing network computer 108 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The processing network computer 108 may use any suitable wired or wireless network, including the Internet.

The resource provider computer 104 may also have, or may receive communications from, an access device 118 that can interact with the user device 102. In FIG. 1, the access device 118 is located at the resource provider computer 104. However, it could be located at any other suitable location in other embodiments of the invention. The resource provider computer 104 may include any suitable computational apparatus operated by a resource provider (e.g., a merchant). In some embodiments, the resource provider computer 104 may include one or more server computers that may host one or more websites associated with the resource provider (e.g., a merchant). In some embodiments, the resource provider computer 104 may be configured to send data to a processing network computer 108 via a transport computer 106 as part of a payment verification and/or authentication process for a transaction between the user 103 (e.g., consumer) and the resource provider. The resource provider computer 104 may also be configured to generate authorization request messages for transactions between the resource provider and the user 103, and route the authorization request messages to the authorizing entity computer 110 (e.g., via the processing network computer 108) for additional transaction processing.

The access device 118 may include input/output (I/O) device(s) 120, one or more processor(s) 122, and a computer readable medium 124. The I/O device(s) 120 may include an imaging device (e.g., a camera), a digital scanner, a barcode reader, a microphone, etc., configured to interact with the user device 102. In some embodiments, the access device 118 may be configured to manage access to a resource. By way of example, the access device 118 may be located at a turnstile at a transit gate of a transit station and the access device 118 may manage operation of the turnstile to allow access to a portion of the transit station.

Figure 2:
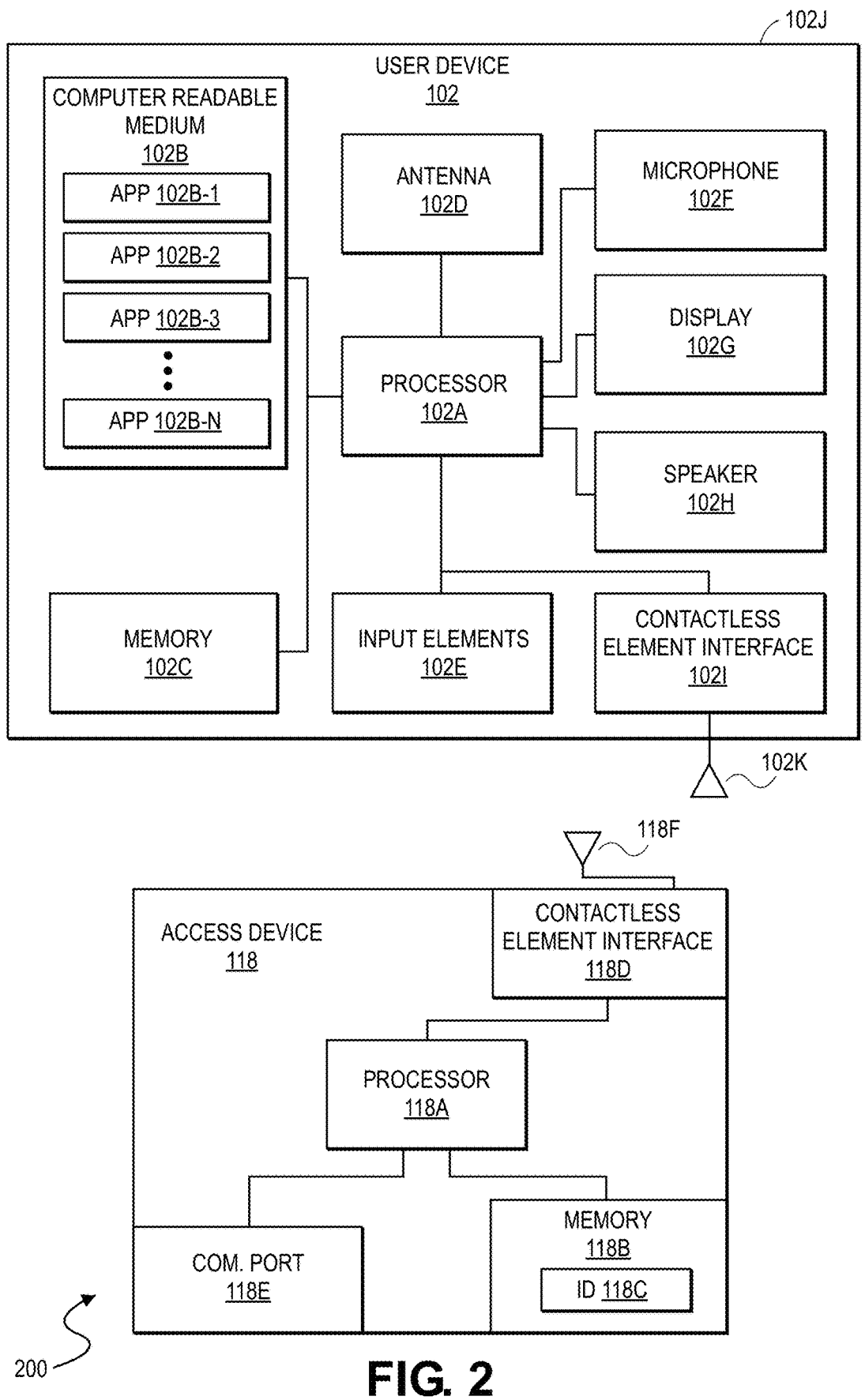
FIG. 2 shows a block diagram of a user device and an access device according to an embodiment.

FIG. 2 shows a block diagram 200 of a user device 102 of FIG. 1 and an access device 118 according to an embodiment.

The user device 102 may also include a processor 102A (e.g., a microprocessor) for processing the functions of the user device 102 and a display 102G to allow a user to view information. The user device 102 may further include input elements 102E (e.g., a touchscreen, keyboard, touchpad, sensors such as biometric sensors, etc.), a speaker 102H, and a microphone 102F, each of which is operatively coupled to the processor 102A. A contactless element interface 102I, an antenna 102D, a memory 102C, and a computer readable medium 102B may also be operatively coupled to the processor 102A.

The computer readable medium 102B and the memory 102C may be present within a body 102J. The body 102J may be in the form a plastic substrate, housing, or other structure. In some cases, the memory 102C may be a secure element, and/or may also store information such as access data, including tokens, PANs, tickets, etc. Information in the memory 102C may be transmitted by the user device 102 to another device using an antenna 102D or contactless element interface 102I. The user device 102 may use antenna 102D for wireless data transfer (e.g., using wireless networking protocols such as IEEE (Institute of Electronics Engineers) 802.11) or mobile phone communication (e.g., 3G, 4G, and/or LTE). Antenna 102K of contactless element interface 102I may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism.

In some embodiments, the contactless element interface 102I is implemented in the form of a semiconductor chip (or other data storage element) with an associated wireless transfer (e.g., data transmission) element, such as antenna 102K. Data or control instructions that are transmitted via a cellular network may be applied to the contactless element interface 102I. Contactless element interface 102I may be capable of transferring and receiving data using a short range wireless communication capability. Thus, the user device 102 may be capable of communicating and transferring data or control instructions via both a cellular network (or any other suitable wireless network—e.g., the Internet or other data network) or any short range communications mechanism.

The computer readable medium 102B may include code, executable by the processor, for implementing methods discussed herein.

The computer readable medium 102B may contain one or more service provider applications 102B-1-102B-n. The service provider applications 102B-1-102B-n can, in conjunction with the processor 102A, allow the user device 102 to communicate with various service provider computers. Each application can provide functions provided by its respective service provider. Examples of service provider applications can include digital wallet applications, payment applications (e.g., mobile banking application designed and maintained by a bank or payment processing network), merchant applications (e.g., enabling a user's participation in a loyalty rewards program), transit applications (e.g., storing credit from a prepaid card), ticketing applications (e.g., may store pre-purchased tickets for access to an event or location), applications to access secure data, etc.

Access device 118 includes a processor 118A. The processor 118A may be operatively coupled to a memory 118B which may include an access device type identifier 118C, a contactless element interface 118D which may include an antenna 118F, and a communication port 118E. Contactless element interface 118D is configured to communicate with (send and/or receive data) the contactless element interface 102I of the user device 102. In one embodiment, the communication port 118E includes hardware to facilitate wireless network communication (e.g., IEEE 802.11).

Figure 3:
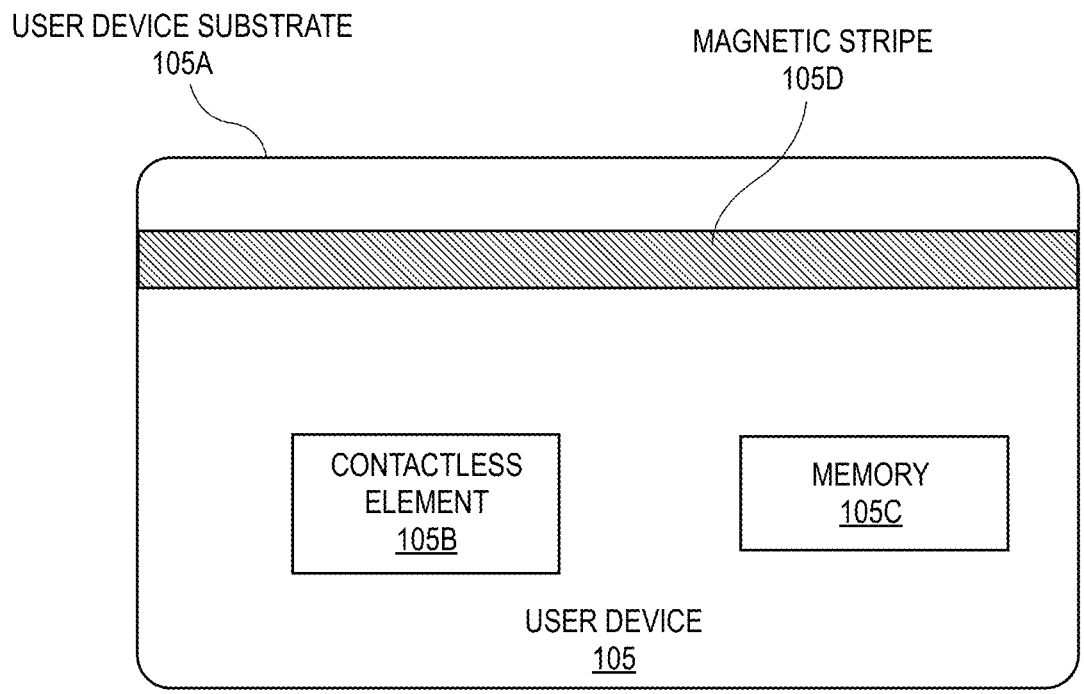
FIG. 3 shows a diagram of a user device according to an embodiment.

FIG. 3 shows a user device 105 in the form of a card. The user device 105 includes a substrate 105A such as a plastic substrate. A contactless element 105B for interfacing with a data access or data transfer device may be on or embedded within the user device substrate 105A. The contactless element 105B may include a chip, and may include the capability to communicate and transfer data using near field communications (NFC) technology or other short range communications technology. The user device 105 may also include a memory 105C, which may store user information such as an account number, expiration date, and a username. Any of the data, applications or code in the computer readable medium 102B and/or the memory 102C in FIG. 2 may be present in the memory 105C in FIG. 3. Information may also be printed or embossed on the substrate 105A. The substrate 105A may also have a magnetic stripe 105D on it.

Figure 4:
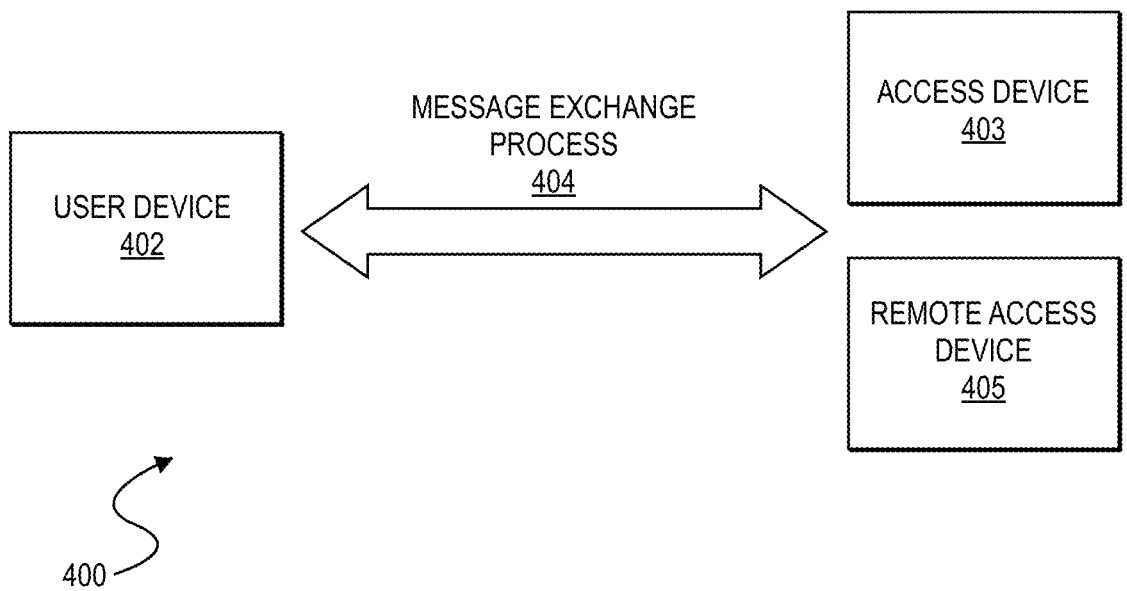
FIG. 4 shows a block diagram depicting a number of message exchange processes between a user device and an access device, according to one or more embodiments.

FIG. 4 shows a diagram of a system 400, according to some embodiments. System 400 includes an access device 403, which may be associated with a first resource provider and a remote access device 405 associated with a second resource provider. The system also includes a user device 402 which may be associated with a user. The user device 402 may be an example of the user device 105 of FIG. 3. A user may use the user device 402 to interact with the access device 403 and/or remote access device 405 to gain access to a resource. In some embodiments, the access device 403 and the remote access device 405 may be located in separate regions (e.g., different countries). In some embodiments, components of the system 400 may be part of a payment processing system that processes payment transactions and/or the system 400 may be part of a system for accessing a resource managed by the access device 403 or remote access device 405 (e.g., a building, an electronic document, or any suitable resource). As a non-limiting example, the system 400 may be part of the system 100 of FIG. 1.

In some embodiments, it would be desirable to allow an application on a user device 402 that is associated with a domestic country of the user device 402 process domestic transactions, while allowing another application on the user device 402 that is associated with a different country or region to process transactions in that country or region. However, current transaction processing systems do not allow for such flexibility without the need to have significantly different hardware and software on the access devices.

The system 400 may be utilized to implement message exchange process 404. Some examples of the message exchange process 404 are described below with respect to FIGS. 5-7.

Message Exchange Process 1

Prior to performing the message exchange process 1 (500) (e.g., an example of the message exchange process 404 of FIG. 4), an authorizing entity (e.g., an issuer, the user's bank, etc.) may initialize the user device 402 with a number of data fields (e.g., as part of a process for personalization of the user device 402). The user device 402 may be configured with one or more applications. In some embodiments, the issuer may assign a priority to these applications. By way of example, one application (e.g., a U.S. payment or access application) on a user device can be associated with a particular transaction processing protocol and may be assigned a high priority. Another application (e.g., a Canadian payment or access application) associated with a different transaction processing protocol may be assigned a low priority on the same user device. Each application may implement a different transaction processing protocol. In some embodiments, associating an application with a "high priority" may indicate a preferred application to be utilized for international transactions while associating an application with a "low priority" may indicate a preferred application to be utilized for domestic transactions. In some embodiments, user device data such as a domestic currency code (e.g., "CAD" for Canadian Dollars) and a country code (e.g., "CAN" for Canada) can be stored on the user device 402. The user device 402 may store additional sensitive user device data such as a PAN (primary account number), a CVV, an expiration date, and any other suitable information.

At step S504, a user (e.g., user 103 of FIG. 1) can subsequently use the user device 402 to initiate a transaction (e.g., a purchase) at the access device 403 operated by a merchant. The user may hold the user device 402 near the access device 403, such that both devices may mutually detect each other. In this example, the access device 403 may be located in a same country with which the card is domestically associated (e.g., Canada). The user may present (e.g., tap, hold near, etc.) the user device 402 to the access device 403 to exchange data with the access device 403. The user device 402 can initiate a payment authorization process or a location access process by tapping the user device 402 to the access device 403.

At step S506, during a process for exchanging data between the user device 402 and the access device 403, the user device 402 may provide the access device 403 with a list of available applications including at least a first application and a second application. In an interaction such as a transaction, the access device 403 may send an available applications request message to the user device 402. The available applications request message can request information regarding which applications (e.g., a list of application identifiers (AIDs)) are available on the user device 402. In some embodiments, the available applications request message may be in the form of a SELECT PPSE command.

At step S508, the user device 402 then identifies, from a memory of the user device, available applications including at least a first application and a second application. The user device 402 then provides (e.g., transmits) an initial or first available applications response message to the access device 403. The available applications response message includes an initial list of the applications (e.g., a list of AIDs) available at the user device 402 in a SELECT PPSE response in response to receiving the SELECT PPSE command. The available applications response message can include an application list including at least the first application (e.g., an international application) and the second application (e.g. a domestic application). The application list can be ordered according to a first priority and a second priority to indicate a preference for the access device 403 to use the first application over the second application to process the interaction. In some embodiments, the applications in the applications list may be ordered according to priority where the higher priority application appears higher in the list.

As shown in step S510, the access device 403 selects an application from the received application list, and then transmits the selection of the application in a select AID message to the user device 402 (step S512). In some embodiments, the access device 403 selects the application highest in the list (e.g., the application associated with the highest priority, in this case the first application). If the interaction is a payment transaction, then this process for application selection may conform to a payment standard such as EMV 1.0 and/or EMV 2.0.

In some embodiments, the user device 402 may check a flag in a memory of the user device 402 before returning the list of applications in step S508. For example, the user device 402 may provide different application lists based at least in part on the flag's value. For example, the user device 402 may be configured to return a list of the applications to include a highest priority application when the flag is not set, and return a list of applications that excludes the highest priority application when the flag is set. In this example, in step S508, the user device 402 may return an applications list that includes a higher priority first application (e.g., an international application) and a lower priority second application (e.g., a domestic application) after determining that the flag is not currently set (e.g., flag=0).

At step S516, the user device 402 may transmit a request for terminal transaction data (e.g., a PDOL request).

At step S518, responsive to the request for terminal transaction data, the access device 403 may send transaction data and also contextual data such as a currency code (e.g., "CAD") and country code (e.g., "CAN" for Canada) associated with the access device 403 to the user device 402. In some embodiments, the access device 403 may send such data in a processing options data object list (PDOL) message to the user device 402. The selected application (e.g., the first application or international application) may receive the data via the PDOL message.

At step S520, the selected application (e.g., the first application) or the user device 402 may compare the currency code and country code received from the access device 403 to the currency code and country code stored in memory of the user device 402 to determine if they are or are not consistent with each other. For example, if the currency code and the country code provided by the access device 403 match the currency code and country code stored at the user device 402 (indicating a domestic transaction), the selected application can set the flag (e.g., flag=1) in a volatile or semi-volatile memory of the user device 402 (e.g., in RAM, or flash memory of the user device 402). In this example, the transaction can be rejected, because the user device 402 should be using the second application (e.g., the domestic application), instead of the higher priority first application (e.g., the international application). The user device 402 can reject the transaction in step S522 by transmitting a message with data indicative of a rejection such as a predetermined error value (e.g., status word 6986) to the access device 403.

The access device 403 receives the message with the rejection from the user device 402. In step S524, in response to receiving the message with the rejection, the access device 403 resends the request applications list message or SELECT PPSE command message to the user device 402.

At step S526, the user device 402 checks the flag (e.g., flag=1) in the memory of the user device 402, before returning a list of applications. In this example, the user device 402 may return a subsequent or second applications list that includes at least the second application (e.g., the domestic application), but excludes the first application (e.g., the international application), after determining that the flag is set. At step S528, the user device 402 sends the modified, subsequent list (or second list) of applications to the access device 403.

At steps S530 and S532, the access device 403 may once again select a highest listed application (i.e., the second application or the domestic application) and may transmit the selection back to the user device 402. This time, the second application (e.g., the domestic application) may complete this domestic transaction according to its predefined payment protocol. This process ensures that domestic transactions are processed by a domestic service provider associated with the second application rather than the international service provider associated with the first application.

At step S534, the user device 402, upon receiving the application selection message at step S532, may send a terminal transaction data request to request transaction data from the access device 403 which may be needed to complete the provisioning process for the selected application associated with the selected AID. In some embodiments, the terminal transaction data request may be in the form of a "Select AID Response" and may include application identifier (AID) file control information (FCI) with the selected AID as the dedicated file name. The terminal transaction data request may include a list of transaction data identifiers to request the appropriate data from the access device 403. The list of transaction data identifiers can be in the form of a processing options data object list (PDOL).

The transaction data requested by the user device 402 for the transaction may include terminal processing options (TPO), an amount, and other information. In addition, the transaction data may include one or more dynamic data elements (e.g., a random number).

At step S536, after receiving the terminal transaction data request from user device 402, the access device 403 may send, to the user device 402, the terminal transaction data requested by the user device 402. In some embodiments, the terminal transaction data may be sent in the form of a get processing options (GPO) command, and may include the requested terminal transaction data in a processing options data object list (PDOL). The terminal transaction data (e.g., Transaction Processing Options (TPO)) may include a TPO indicator that indicates which transaction data types the access device 403 supports.

Once the user device 402 receives the terminal transaction data, the user device 402 may obtain relevant credentials (e.g., card credentials), and may send a set of transaction processing information to the access device 403. In some embodiments, the transaction processing information can be sent in the form of a "get processing options" (GPO) response. In some embodiments, the transaction processing information may include one or more application file locators (AFLs) that can be used as file addresses by access device 403 to read account data stored on the user device 402, and an application interchange profile (AIP) that can be used to indicate the capabilities of the payment application.

The transaction processing information may include any credentials for the transaction including a cryptogram generated using transaction information, Track-2 equivalent data (e.g., PAN, expiration date), and/or additional data. For example, the cryptogram may be generated using transaction information, which may include a dynamic data element (e.g., the random number), the user device 402 identifier (e.g., a PAN), and optionally other information such as a session identifier, a value such as a zero dollar amount, and a transaction counter. The transaction processing information may also include issuer application data (IAD), a form factor indicator (FFI), card transaction qualifiers (CTQ), cryptogram information data (CID), and/or an application PAN sequence number (PAN). In some embodiments, the issuer application data (IAD) may include a length indicator indicating the length of the IAD, a cryptogram version number (CVN) indicating the version of the transaction cryptogram, a derived key indicator (DKI) that can be used to identify a master key (e.g., a master key associated with the issuer), and/or card verification results (CVR).

In some embodiments, after the access device 403 receives the transaction processing information, in step S538, the access device 403 may send an account data request to the user device 402 to read additional account data that may be stored on the user device 402. In some embodiments, the account data request may be in the form of a "read record" command, and may include an application file locator (AFL) indicating a location of the account data that the access device 403 is attempting to read. The AFL included in the account data request may correspond to an AFL in the transaction processing information that was provided to the access device 403 from user device 402.

In response to receiving the account data request from the access device 403 in step S540, the user device 402 may send account data stored at the location indicated by the AFL to the access device 403. In some embodiments, the account data may be sent in the form of a "read record" response. The account data may include, for example, application usage control that indicates the issuer's restrictions on usage and services allowed for the application, the cardholder's name, customer exclusive data, issuer country code, and/or other account related data that is accessible at the AFL location and is stored in the user device 402. The account data, transaction processing information, and other data received by the access device 403 in previous steps may be subsequently used by the access device 403 to complete the payment transaction.

At some point, the user may remove the user device 402 from the access device 403, or otherwise disengage the user device 402 from the access device 403. Upon removal or disengagement, the user device 402 may be powered off which also powers off the volatile memory of the user device 402, clearing the flag previously set on the user device 402.

In a subsequent transaction, the user may present the user device 402 to a remote access device 405 in a remote location (relative to the access device 403, and not necessarily relative to the user device 402 in FIG. 4). The remote access device 405 may be located in a country that is associated with a different country code from the one stored on the user device 402. By way of example, the user may present the user device 402 to the remote access device 405 located in the United States to initiate a payment transaction, even though the user device 402 has a country code of Canada stored on it.

Figure 5:
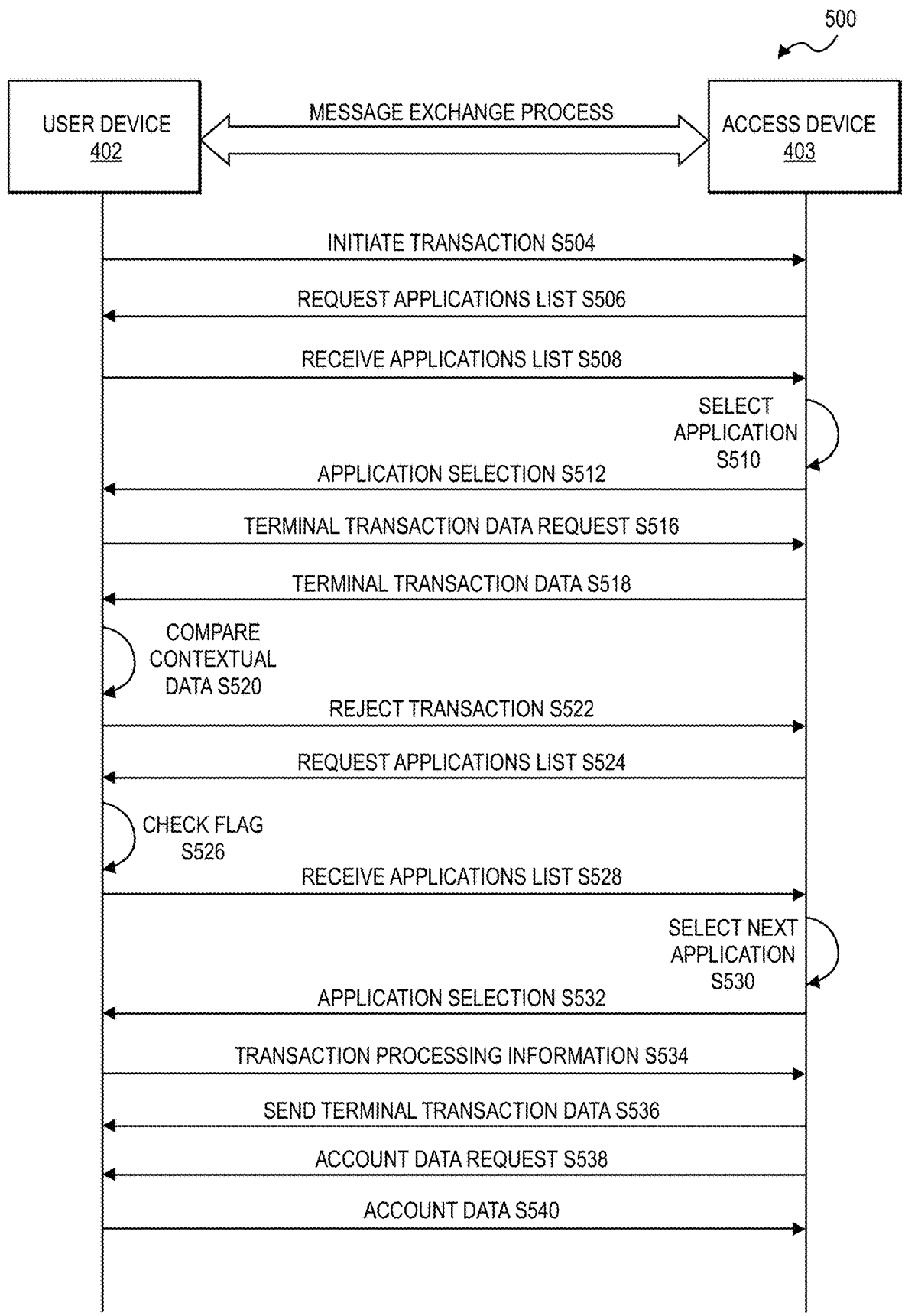
FIG. 5 shows a flow diagram illustrating one embodiment.

In the subsequent transaction, steps S504 and S506 in FIG. 5 may be repeated, but this time between the user device 402 and the remote access device 405. Since the flag was cleared at the end of the previous transaction, and is currently not set (e.g., flag=0), the user device 402 may provide a list of available applications according to the original priority in the user device. For example, the user device 402 may provide a list of available applications including a first application (e.g., an international application) and a second application (e.g., a domestic application), where the first application has a higher priority than the second application. Similar to step S510, the access device 403 may then select the highest listed application from the provided list (e.g., the first application or the international application).

The remote access device 405 may send a currency code (e.g., "USD" for United States Dollars) and country code (e.g., "USA" for United States of America) associated with the remote access device 405 to the user device 402 in a (PDOL) message to the user device 402 (similar to step S518 in FIG. 5). The selected application (e.g., the first application or the international application) may receive the data via the PDOL message.

The selected application (e.g., first application) executing at the user device 402 may compare the country code and currency code received from the international access device 403 with the country code and currency code stored at the user device 402 (as in step S520). When the country codes and/or currency codes do not match (as would be the case in this example, since the user device 402 has a country code of Canada and the access device 403 provides a location of USA), the first application may proceed with processing the transaction.

Steps S534-S540 as in FIG. 5 would then be subsequently performed, and the descriptions thereof are incorporated herein.

Utilizing the techniques of this first message exchange process, the system 400 may ensure that a domestic application is utilized for domestic transactions while a different application is utilized for international transactions, without modifying the access device 403 or remote access device 405 in any way. Stated differently, the access device 403 and the remote access device 405 can have the same or substantially similar hardware and software, and can still effectively operate with the user device 402.

It should be appreciated that country codes and currency codes are used for illustrative purposes only in this embodiment and the other embodiments described herein. The access devices described herein may provide any suitable combination of contextual data such as 1) a recorded log of previous transactions, 2) an indication of a particular application selected for a previous transaction, 3) a currency code of a previous transaction, 4) a terminal country code of a previous transaction, 5) a transaction type of a previous transaction, 6) a current transaction application selection, 7) a currency code associated with the current transaction/current access device, 8) a terminal country code associated with the current transaction/current access device, and/or 9) a transaction type of current transactions. In some embodiments, an application (e.g., the international application, a highest priority application, etc.) of the user devices described herein (e.g., the user device 402) may utilize predefined rules and any suitable combination of the contextual data provided by the access device 403 to determine whether to proceed with the transaction or to set the flag in memory and reject the transaction as described above.

Message Exchange Process 2

Figure 6:
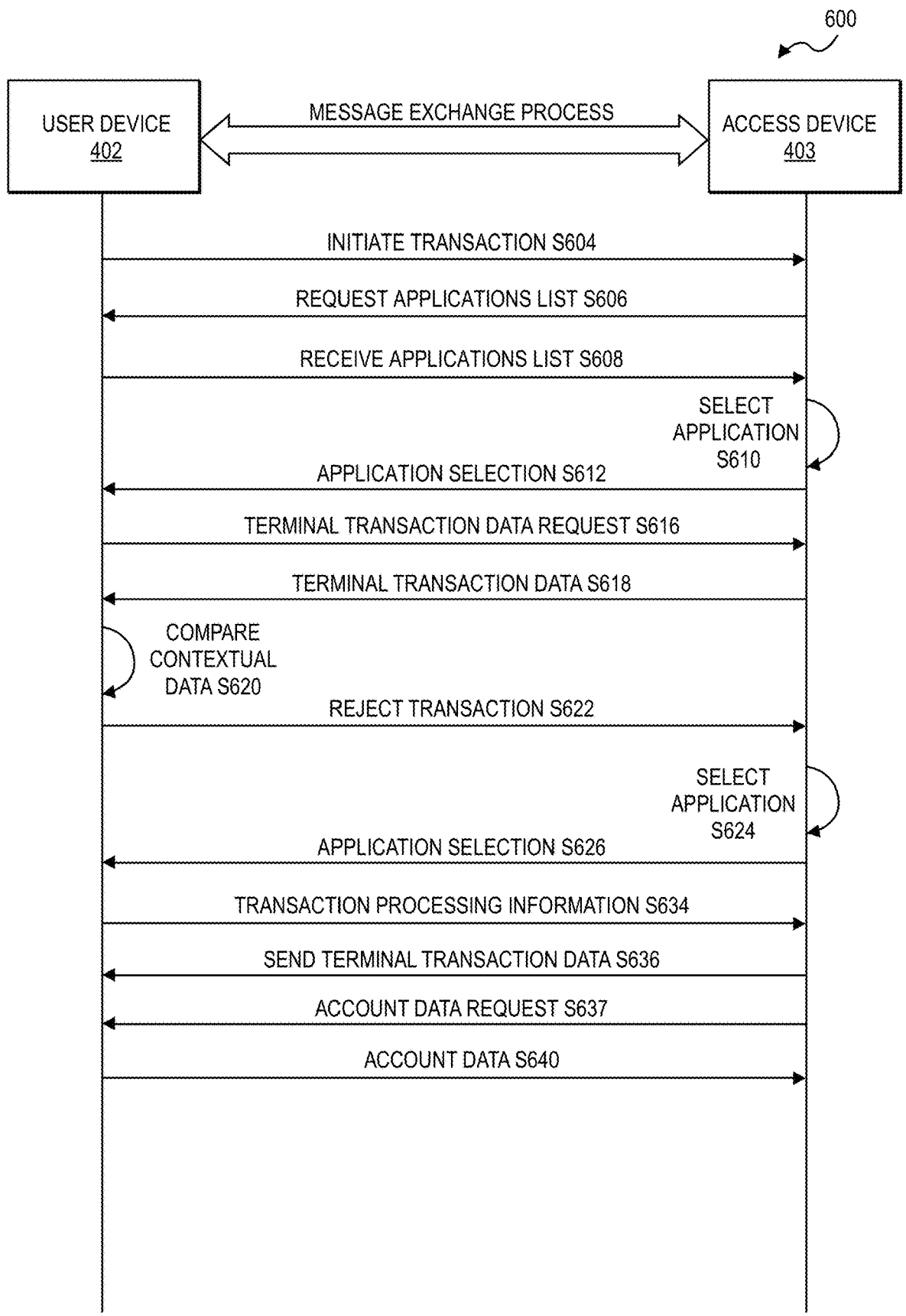
FIG. 6 shows a flow diagram illustrating another embodiment.

Prior to performing the message exchange process 2 (600) (e.g., an example of the message exchange process 404 of FIG. 4) shown in FIG. 6, an authorizing entity (e.g., an issuer, the user's bank, etc.) may initialize the user device 402 with a number of data fields (e.g., as part of a process for personalization of the user device 402). The user device 402 may be configured with one or more applications. In some embodiments, the issuer may assign a priority to these applications. By way of example, one application (e.g., an international application) associated with a particular transaction processing protocol may be assigned a high priority, while another application (e.g., a domestic application) associated with a different transaction processing protocol may be assigned a low priority. Each application may implement different transaction processing protocols. In some embodiments, a "high priority" application may indicate an application to be utilized for international transactions, while a "low priority" application may be an application to be utilized for domestic transactions. A domestic currency code (e.g., "CAD" for Canadian Dollars) and a country code for the card (e.g., "CAN" for Canada) can be stored on the user device 402. The user device 402 may store additional sensitive data such as a PAN (primary account number), a CVV, an expiration date, and any other suitable information.

At step S604, a user (e.g., user 103 of FIG. 1) can subsequently use the user device 402 to initiate a transaction (e.g., a purchase) at the access device 403 operated by a merchant. The user may hold the user device 402 near the access device 403, such that both devices may mutually detect each other. In this example, the access device 403 may be located in a same country with which the card is domestically associated (e.g., Canada). The user may present (e.g., tap, hold near, etc.) the user device 402 to the access device 403 to exchange data with the access device 403. The user device 402 can initiate a payment authorization process or a location access process by tapping the user device 402 to the access device 403.

At steps S606 and S608, during a process for exchanging data between the user device 402 and the access device 403, the user device 402 may receive a request for a list of available applications and may provide the access device 403 with the list of available applications (e.g. a first application such as an international application and a second application such as a domestic application). The access device 403 may send an available applications request message (step S606) to the user device 402 to request information regarding which applications (e.g., a list of application identifiers (AIDs)) are available on the user device 402. In some embodiments, the available applications request message may be in the form of a SELECT PPSE command. In some embodiments, the applications may be ordered according to priority where the higher priority application appears higher in the list.

As shown in step S610, the access device 403 selects an application (in this case, a first application or international application) from the received application list. The access device 403 then transmits the selection of the application in a select AID message (step S612). In some embodiments, the access device 403 selects the application highest in the list (e.g., the application associated with the highest priority, in this case the first application or the international application).

At step S616, the user device 402 may transmit a request for terminal transaction data (e.g., a PDOL request).

At step S618, the access device 403 may send contextual data such as a currency code (e.g., "CAD") and a country code (e.g., "CAN" for Canada) associated with the access device 403 to the user device 402. In some embodiments, the access device 403 may send such data in a processing options data object list (PDOL) message to the user device 402. The selected application (e.g., the first application) may receive the data via the PDOL message.

At step S620 of message exchange process 500, the selected application (e.g., the first application or international application) may compare the currency code and country code received from the access device 403 to the currency code and country code stored in memory of the user device 402. If the currency code and the country code match, the application may reject the transaction by transmitting a message (step S622) to the access device 403 with a predetermined error value (e.g., status word 6985). The access device 403 then removes the sending application from the application list upon receipt of the predetermined error value. Accordingly, the access device 403 may remove the first application from the application list (e.g., a first application list) of the user device 402 to form a new application list (e.g., a second application list).

In step S624, the access device 403 may then reselect an application (step S624). In this case, the access device 403 may select the next highest priority application (e.g., the second application or the domestic application) still in the applications list. The second application may then complete this transaction according to its predefined protocol. This process ensures that domestic transactions are processed by the domestic payment provider, rather than the international payment provider.

Steps S626, S634, S636, S637, and S640 are similar to steps S532, S534, S536, S538, and S540 in FIG. 5, and the descriptions thereof are incorporated herein and need not be repeated.

At some point in time, the user may remove the user device 402 or disengage the user device 402 from the access device 403.

Subsequently, the user may present the user device 402 to remote access device 405. The remote access device 405 may be located in a country that is associated with a different country code from the one stored on the user device 402. By way of example, the user may present the user device 402 to the remote access device 405 located in the United States to initiate a payment transaction.

Steps S604 and S606 in FIG. 6 may be repeated, but this time between the user device 402 and the remote access device 405. The user device 402 may provide its list of available applications (e.g., a first application such as an international application and a second application such as a domestic application) sorted by priority. The remote access device 405 selects the highest listed application from the provided list (e.g., the first application or the international application).

The remote access device 405 may send contextual data such as a currency code (e.g., "USD" for United States Dollars) and country code (e.g., "USA" for United States of America) associated with the remote access device 405 to the user device 402 in a (PDOL) message (similar to step S618). The selected application (e.g., the first application) may receive the data via the PDOL message.

Similar to step S620, the selected application (e.g., the first application) executing at the user device 402 may compare the country code and currency code received from the remote access device 405 with the country code and currency code stored at the user device 402. When the country codes and/or currency codes do not match (as would be the case in this example), the first application may proceed with processing the transaction.

Steps S634-S640 as in FIG. 6 would then be subsequently performed, and the descriptions thereof are incorporated herein.

Utilizing the techniques of this second message exchange process, the system 400 may ensure that a domestic application is utilized for domestic transactions while a different application (e.g., an international application) is used for international transactions. Significant modifications to the access device 403 or remote access device 405 are not needed.

Message Exchange Process 3

Figure 7:
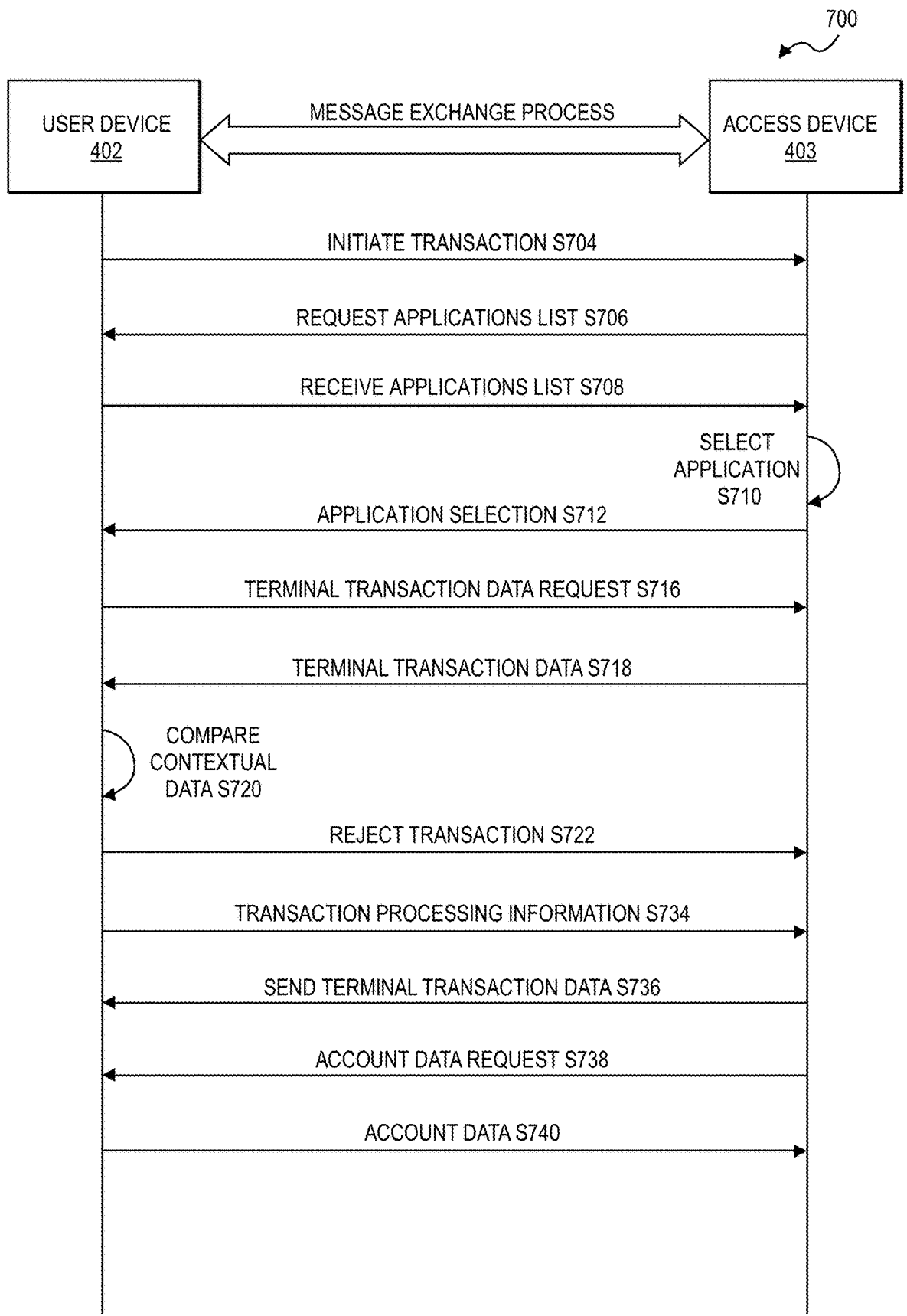
FIG. 7 shows a flow diagram illustrating another embodiment.

Prior to performing the message exchange process 3 (700) (e.g., an example of the message exchange process 404 of FIG. 4) shown in FIG. 7, an authorizing entity (e.g., an issuer) may initialize the user device 402 with a number of data fields (e.g., as part of a process for personalization of the user device 402). The user device 402 may be configured with one or more applications. In some embodiments, the issuer may assign a priority to these applications. By way of example, one application may be associated a particular transaction processing protocol while another application may be associated with a different transaction processing protocol. During initialization of the user device (e.g., a Canadian debit card) or at any suitable time, the authorizing entity may set a first application (e.g., a domestic application) as being associated with priority 1 (e.g., a high priority) and a second application (e.g., an international application) as being associated with priority 2 (e.g., a low priority). User device data such as a domestic currency code (e.g., "CAD" for Canadian Dollars) and a country code for the user device (e.g., "CAN" for Canada) can be stored on the user device. The user device 402 may store additional sensitive user device data such as a PAN (primary account number), a CVV, an expiration date, and any other suitable information.

At step S704, a user (e.g., user 103 of FIG. 1) can use the user device 402 to initiate a transaction (e.g., a purchase) at the access device 403 operated by a merchant. By way of example, the user may hold the user device 402 near the access device 403, such that both devices may mutually detect each other. The access device 403 may be located in a same country (e.g., Canada) for which the user device 402 is domestically associated (e.g., Canada). The user may present (e.g., tap, swipe, etc.) the user device 402 to the access device 403 to exchange data with the access device 403. By way of example, the user device 402 can provide payment credentials to the access device 403, which may initiate a payment authorization process.

At steps S706 and S708, during a process for exchanging data between the user device 402 and the access device 403, the user device 402 may receive a request for and may provide the access device 403 with a list of available applications (e.g., a first application such as a domestic application and a second application such as an international application). By way of example, the access device 403 may send an available applications request message to the user device 402 (step S706) to request information regarding which applications (e.g., a list of application identifiers (AIDs)) are available on the user device 402. In some embodiments, the available applications request message may be in the form of a SELECT PPSE command. In some embodiments, the user device 402 may provide a list of the applications available at the user device 402 to the access device 403 (step S708) in response to receiving the SELECT PPSE command. In some embodiments, the applications may be ordered according to priority where the higher priority application appears higher in the list. In some embodiments, the applications of the list may individually be associated with a corresponding priority (e.g., low, high, etc.).

As shown in step S710, the access device 403 selects an application (in this case, the first application or the domestic application) from the received application list, and then transmits the selection of the application in a select AID message (step S712). In some embodiments, the access device 403 may select the application with the highest priority in the list.

At step S716, the user device 402 may transmit a request for terminal transaction data (e.g., a PDOL request) to the access device 403.

At step S718, the access device 403 may send contextual data including a currency code (e.g., "CAD") and country code (e.g., "CAN" for Canada) associated with the access device 403 to the user device 402. In some embodiments, the access device 403 may send such data in a processing options data object list (PDOL) message to the user device 402. The selected application (e.g., the first application or the domestic application) may receive the data via the PDOL message.

At step S720, the application executing on the user device 402 (e.g., the first application) compares the currency code and country code received from the access device 403 to the currency code and country code stored in the memory of the user device 402 to determine if they are or are not consistent with each other. If the currency code and the country code match, the selected application may proceed with processing the transaction.

The transaction may then continue with steps S734, S736, S738, and S740 which are similar to steps S534, S536, S538, and S540 in FIG. 5. The descriptions of these steps and the descriptions thereof are incorporated herein, and need not be repeated.

At some point in time, the user may remove or otherwise disengage the user device 402 from the access device 403.

At a later time, the user may present the user device 402 to a remote access device 405. The remote access device may be located in a country that is associated with a different country code from the one stored on the user device 402. By way of example, the user may present the user device 402 in the United States to initiate a payment transaction.

Steps S704 and D706 may be repeated, but this time the transaction is between the user device 402 and the remote access device 405 (e.g., an access device located in a different country than the country associated with the user device 402). Similar to step S708, the user device 402 may provide its list of available applications (e.g., the first application such as a domestic application, and a second application such as an international application) sorted by priority. Similar to step S710, the remote access device 405 selects the highest priority application from the provided list (e.g., the first application or the domestic application) and transmits the same to the user device 402 (similar to step S712). Similar to step S716, the user device 402 can send a terminal transaction data request to the remote access device 705.

The remote access device 405 may send a currency code (e.g., "USD" for United States Dollars) and a country code (e.g., "USA" for United States of America) associated with the remote access device 405 to the user device 402 in a (PDOL) message (similar to step S718) to the user device 402. The selected application (e.g., the first application or the domestic application) may receive the data via the PDOL message.

The selected application (e.g., the first application or the domestic application) executing at the user device 402 may then compare the country code and the currency code received from the remote access device 405 with the country code and currency code stored at the user device 402 to determine if they are or are not consistent with each other (similar to step S720). When the country codes and/or currency codes are not consistent with each other (e.g., do not match) (as would be the case in this example because "CAD" does not match "USD" and "CAN" does not match "USA"), the first application may reassign the priorities of the applications such that the application that was previously associated with the lower priority (e.g., the second application or the international application) may be associated with the higher priority, and the application that was previously associated with the higher priority (e.g., the first application) may be now associated with the lower priority. In some embodiments, the application may reassign any suitable data fields in memory of the user device 102 to indicate these new priorities. The selected application (e.g., the first application) may reject the transaction to cause the user or remote access device 405 to retry the transaction (step S722). In some embodiments, this may require the user to provide a second tap of the user device 402 to the remote access device 405 to initiate a new transaction.

In either scenario, once the user taps the user device 402 for a second time at the remote access device 405 or the remote access device 405 retries the transaction, the new transaction processing may follow the same steps S704 and S706 described above. However, in this use case, user device 402 provides the reordered, subsequent list of available applications (e.g., the second application such as an international application as the highest priority and the first application such as a domestic application as a lower priority, where the second application should be processed before the first application) sorted by the new priorities. The remote access device 405 may select the highest listed application from the provided list (e.g., the second application or the international application).

The transaction may then continue with steps similar to S712-S720 and S734-S740 in FIG. 7 as described above.

If the user were to proceed with another international transaction, the priorities would still be set appropriately to ensure that the non-domestic transaction processing protocol is utilized. However, should the user return to his home country, the user device 102 would still list the second application as higher priority and the first application as a lower priority.

By way of example, the user may return and attempt a transaction once again with the access device 403. The user device 402 may provide its list of available applications (e.g., a second application such as an international application and a first application such as a domestic application) sorted by priority. The access device 403 may then select the highest listed application from the provided list. This process is similar to steps S704-S712 above).

The access device 403 may then send a currency code (e.g., "CAD" for Canadian Dollars) and country code (e.g., "CAN" for Canada) associated with the access device 403 to the user device 402 in a (PDOL) message (as in step S718) to the user device 402. The selected application (e.g., the second application or the international application) may receive the data via the PDOL message.

The selected application (e.g., the second application) executing at the user device 402 may compare the country code and currency code received from the international access device 403 with the country code and currency code stored at the user device 402 (similar to step S720). When the country codes and/or currency codes do not match (as would be the case in this example because "CAD" does not match "USD" and "CAN" does not match "USA"), the second application or the international application may reassign the priorities of the application such that the application that was previously associated with the lower priority (e.g., the first application or the domestic application) may be associated with the higher priority, and the application that was previously associated with the higher priority (e.g., the second application or the international application) may be now associated with the lower priority. In some embodiments, the application may reassign any suitable data fields in memory of the user device 102 to indicate these new priorities. The selected application (e.g., the second application or the international application) may reject the transaction to cause the user or access device 403 to retry the transaction. In some embodiments, this may require the user to provide a second tap of the user device 402 to the access device 403 to initiate a new transaction.

If the user or access device 403 retries the transaction, the priorities would still be set appropriately to ensure that the domestic transaction processing protocol used by the first application or the domestic application is used for this domestic transaction.

Using the techniques of third message exchange process, the system 400 may ensure that a domestic application is utilized for domestic transactions while a different application is utilized for international transactions. This can be done without modifying the access device 403 or remote access device 405, relative to each other.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving, by a user device from an access device, a first available applications request message for processing a transaction, wherein the user device stores a user device data and a list of applications comprising a plurality of applications;
    identifying, by the user device, a first application and a second application among the plurality of applications;
    transmitting, by the user device to the access device, a first available applications response message comprising a first application list comprising the first application and the second application, wherein the first application list is ordered according to a higher priority of the first application than a priority of the second application, to indicate a preference for the access device to use the first application to process the transaction;
    in response to the transmitting the first available applications response message, receiving, by the user device from the access device, a selection of the first application;
    receiving, by the user device from the access device, contextual data associated with the transaction;
    determining, by the user device, whether the first application is to be used by the access device for processing the transaction, by comparing, using the selected first application, the received contextual data to the user device data;
    in response to the determining that the first application is not to be used by the access device for processing the transaction, transmitting, by the user device to the access device, a rejection message indicating a rejection of the transaction by the user device;
    in response to the transmitting the rejection message, receiving, by the user device from the access device, a second available applications request message;
    transmitting, by the user device to the access device, a second available applications response message comprising a second application list comprising the second application with a higher priority than a priority of the first application;
    receiving, by the user device from the access device, a selection of the second application; and
    processing, by the user device, the transaction using the second application.

2. The method of claim 1, wherein the determining whether the first application is to be used by the access device for processing the transaction further comprises:
    determining whether the received contextual data is consistent with the user device data, and
    determining that the first application is not to be used by the access device for processing the transaction by determining that the received contextual data is consistent with the user device data.

3. The method of claim 1, wherein the first application list is an initial application list for the transaction, and the second application list is a subsequent application list for the transaction.

4. The method of claim 1, wherein the second application list comprises the second application and not the first application.

5. The method of claim 1, wherein the determining whether the first application is to be used by the access device for processing the transaction further comprises:
    determining whether the received contextual data is the same as the user device data, and
    determining that the first application is not to be used by the access device for processing the transaction by determining that the received contextual data is the same as the user device data.

6. The method of claim 1, wherein the transmitting the first available applications response message further comprises:
    identifying a value for a flag stored in a volatile memory of the user device; and
    based on the value of the flag, identifying to transmit the first application and the second application in the first application list.

7. The method of claim 1, wherein the first application list and the second application list include application identifiers for the plurality of applications in the first application list and the second application list, respectively.

8. The method of claim 7, wherein the plurality of applications comprise applications data that allow a user of the user device to access different locations via different access devices.

9. The method of claim 1, wherein the received contextual data comprises an identifier for a geographic location of the access device.

10. The method of claim 1, wherein the user device is a card.

11. The method of claim 1, wherein the user device includes a contactless element coupled to a processor.

12. The method of claim 1, wherein the second application list comprises the first application and the second application.

13. The method of claim 1, wherein the first available applications request message, the second available applications request message, the first available applications response message, and the second available applications response message are transmitted using a near-field communication (NFC) protocol, respectively.

14. The method of claim 1, further comprising:
prior to the receiving the contextual data associated with the transaction, transmitting a terminal transaction data request, to the access device, for providing the contextual data.

15. A user device comprising:
a memory configured to store a list of applications and a user device data;
at least one processor; and
a non-transitory computer-readable medium storing at least one instruction that, when executed by the at least one processor, causes the at least one processor to perform a method including:
receiving, from an access device, a first available applications request message for a transaction;
identifying, by the user device, a first application and a second application in the list of applications;
transmitting, to the access device, a first available applications response message comprising a first application list comprising the first application and the second application, wherein the first application list is ordered according to a higher priority of the first application than a priority of the second application, to indicate a preference for the access device to use the first application to process the transaction;
in response to the transmitting the first available applications response message, receiving, from the access device, a selection of the first application;
receiving, from the access device, contextual data associated with the transaction;
determining whether the first application is to be used by the access device for processing the transaction, by comparing, using the selected first application, the received contextual data to the user device data;
in response to the determining that the first application is not to be used by the access device for processing the transaction, transmitting, to the access device, a rejection message indicating a rejection of the transaction by the user device;
in response to the transmitting the rejection message, receiving, from the access device, a second available applications request message;
transmitting, to the access device, a second available applications response message comprising a second application list comprising the second application with a higher priority than a priority of the first application;
receiving, from the access device, a selection of the second application; and
processing the transaction using the second application.

16. The user device of claim 15, further comprising a contactless element coupled to the at least one processor.

17. The user device of claim 15, wherein the memory is further configured to store a flag, and wherein the at least one processor identifies to transmit the first application and the second application in the first application list to the access device based on a value of the flag.

18. The user device of claim 15, wherein the user device is a card.

19. A system comprising:
an access device; and
a user device comprising a memory configured to store a list of applications and a user device data, at least one processor, and a non-transitory computer-readable medium storing at least one instruction that, when executed by the at least one processor, causes the at least one processor to perform a method including:
receiving, from the access device, a first available applications request message for a transaction;
identifying, by the user device, a first application and a second application in the list of applications;
transmitting, to the access device, a first available applications response message comprising a first application list comprising the first application and the second application, wherein the first application list is ordered according to a higher priority of the first application than a priority of the second application, to indicate a preference for the access device to use the first application to process the transaction;
in response to the transmitting the first available applications response message, receiving, from the access device, a selection of the first application;
receiving, from the access device, contextual data associated with the transaction;
determining whether the first application is to be used by the access device for processing the transaction, by comparing, using the selected first application, the received contextual data to the user device data;
in response to the determining that the first application is not to be used by the access device for processing the transaction, transmitting, to the access device, a rejection message indicating a rejection of the transaction by the user device;
in response to the transmitting the rejection message, receiving, from the access device, a second available applications request message;
transmitting, to the access device, a second available applications response message comprising a second application list comprising the second application with a higher priority than a priority of the first application;
receiving, from the access device, a selection of the second application; and
processing the transaction using the second application.

20. The system of claim 19, wherein each of the first available applications request message, the second available applications request message, the first available applications response message, and the second available applications response message is an Application Protocol Data Unit (APDU) message.

* * * * *